United States Patent [19]

Sims

[11] Patent Number: 5,213,086
[45] Date of Patent: May 25, 1993

[54] FUEL INLET SYSTEM FOR INTERNAL COMBUSTION ENGINE

[75] Inventor: Fred Sims, Abbotsford, Canada

[73] Assignee: Carbco Technologies Inc., Vancouver, Canada

[21] Appl. No.: 731,767

[22] Filed: Jul. 17, 1991

Related U.S. Application Data

[63] Continuation-in-part of Ser. No. 722,256, Jun. 27, 1991, abandoned.

[51] Int. Cl.⁵ .................................................. F02M 31/00
[52] U.S. Cl. ........................................ 123/514; 123/556; 123/555; 261/50.1
[58] Field of Search ............... 123/514, 555, 556, 557, 123/553, 552, 545, 25 B, 25 P; 261/145, 50.1, 50.2, 36.2, 44.2, 44.5

[56] References Cited

U.S. PATENT DOCUMENTS

| | | | |
|---|---|---|---|
| 3,545,730 | 12/1970 | Bascle | 261/50.2 |
| 3,672,342 | 6/1972 | Ojala | |
| 3,815,565 | 6/1974 | Stelter | |
| 3,907,940 | 9/1975 | Thatcher | 261/1 |
| 4,044,746 | 8/1977 | Kaye | |
| 4,050,430 | 9/1977 | Amagai et al. | 123/556 |
| 4,257,378 | 3/1981 | Bascle, Jr. | 123/514 |
| 4,258,681 | 3/1981 | Gruden et al. | 123/514 |
| 4,285,316 | 8/1981 | Stolz et al. | 123/514 |
| 4,290,405 | 9/1981 | Tipton | 123/585 |
| 4,380,987 | 4/1983 | Crain | 123/514 |
| 4,409,932 | 10/1983 | Gill | 123/25 P |
| 4,411,239 | 10/1983 | Kelch | 123/514 |
| 4,413,604 | 11/1983 | Tune | 123/514 |
| 4,440,138 | 4/1984 | Smith | 123/514 |
| 4,476,817 | 10/1984 | Lindberg | 123/25 B |
| 4,519,358 | 5/1985 | Redele | 123/514 |
| 4,524,744 | 6/1985 | Adams | 123/514 |
| 4,550,706 | 11/1985 | Hoffman | 123/549 |
| 4,562,820 | 1/1986 | Jiminez | 123/514 |
| 4,625,701 | 12/1986 | Bartlett et al. | 123/514 |
| 4,662,327 | 5/1987 | Sprugel et al. | 123/25 E |
| 4,844,028 | 7/1989 | Volcher | 123/25 P |
| 4,913,098 | 4/1990 | Battaglini | 123/25 P |
| 4,986,223 | 1/1991 | Mahoney | 123/25 B |
| 4,989,572 | 2/1991 | Giacomazzi et al. | 123/514 |
| 5,010,867 | 4/1991 | Johnstoneaux | 123/511 |

Primary Examiner—E. Rollins Cross
Assistant Examiner—M. Macy
Attorney, Agent, or Firm—John Russell Uren

[57] ABSTRACT

A fuel inlet system (12) for an internal combustion engine (10) comprises a heat exchanger (22), heated by engine exhaust gases, to preheat air being supplied to a carburetor (14). The air is introduced into the carburetor (14) at a temperature of between about 375° to 400° F. The carburetor (14) has an annular heating chamber (122) in which the heated air is circulated. A fuel inlet conduit (63) is in thermal contact with the heated air in the heating chamber (122) to preheat the fuel. The air and fuel is mixed in two stages, the first being during travel along a conduit (144) and the second in a mixing chamber (170) in the carburetor (14). The carburetor (14) includes a valve (148) for restricting the amount of air flowing to the mixing chamber (170). The fuel inlet system (12) further comprises means (20) for adding water to the air/fuel mixture.

46 Claims, 5 Drawing Sheets

FUEL INLET SYSTEM FOR INTERNAL COMBUSTION ENGINE

CROSS REFERENCE TO RELATED APPLICATION

This application is a continuation-in-part of co-pending United States patent application Ser. No. 07/722,256 filed Jun. 27, 1991 now abandoned.

FIELD OF THE INVENTION

This invention relates to a fuel inlet system for an internal combustion engine and to a carburetor for use in the fuel inlet system.

BACKGROUND OF THE INVENTION

It is estimated that the energy released through combustion of only about 20 percent of the fuel introduced to a carburetor is converted to useful mechanical energy, the remaining 80 percent being wasted. It is, accordingly, an object of the present invention to provide a fuel inlet system by which the major part of the remaining 80 percent of fuel introduced into a carburetor is used in the combustion process to provide useful energy, thus significantly improving the fuel efficiency of an internal combustion engine.

SUMMARY OF THE INVENTION

According to one aspect of the invention, there is provided a fuel inlet system for an internal combustion engine, comprising means for providing a continuous flow of fuel in a main flow line; and means for diverting part of said fuel flowing in said main flow line into a branch line connected to a fuel/air mixing chamber of a carburetor. According to one preferred embodiment, the system further comprises means for mixing said diverted fuel with air in a first mixing zone to obtain a preliminary air/fuel mixture; and means for mixing said preliminary air/fuel mixture with air in a second mixing zone to obtain a combustible air/fuel mixture for injection into an intake manifold of an internal combustion engine.

According to another aspect of the invention, there is provided a carburetor comprising a body member having a fuel inlet and an air inlet; a first mixing zone in the body member; a second mixing zone in the body member; a fuel conduit connecting the fuel inlet to said first mixing zone; a main air flow channel between said air inlet and said second mixing zone; a secondary air flow channel between said air inlet and said first mixing zone; and a fluid flow channel from said first mixing zone to said second mixing zone.

Further objects and advantages of the invention will become apparent from the description of a preferred embodiment of the invention below.

DETAILED DESCRIPTION OF PREFERRED EMBODIMENT

Figure 1:
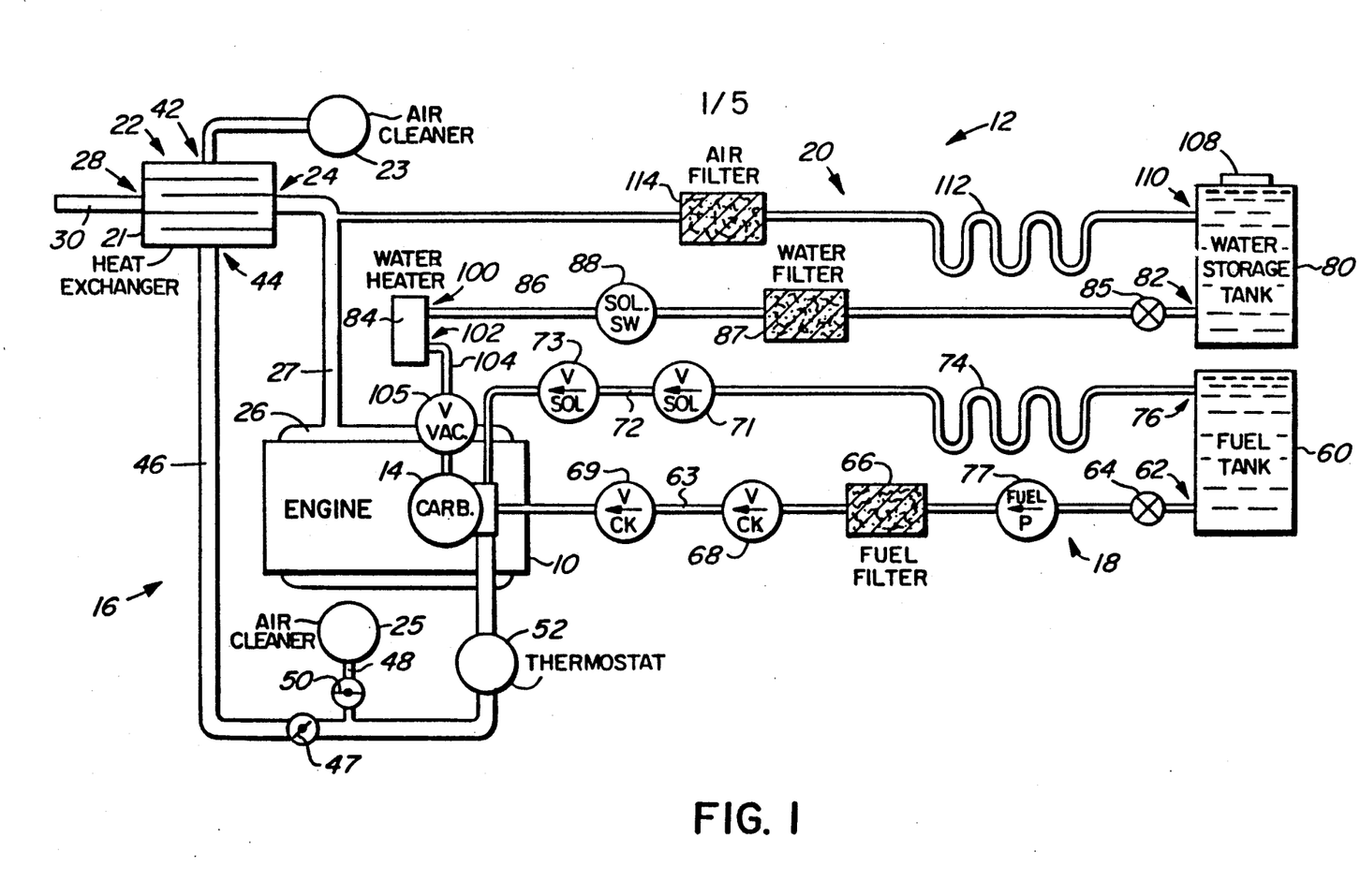
FIG. 1 is a schematical representation of a fuel inlet system according to the invention.

In FIG. 1, an internal combustion engine 10 is shown which is provided with a fuel inlet system, generally indicated at 12, and which includes a carburetor 14. The fuel inlet system 12 comprises three component systems, generally indicated at 16, 18 and 20, for the flow of air, fuel and water, respectively. These systems will now be described in turn.

Figure 2:
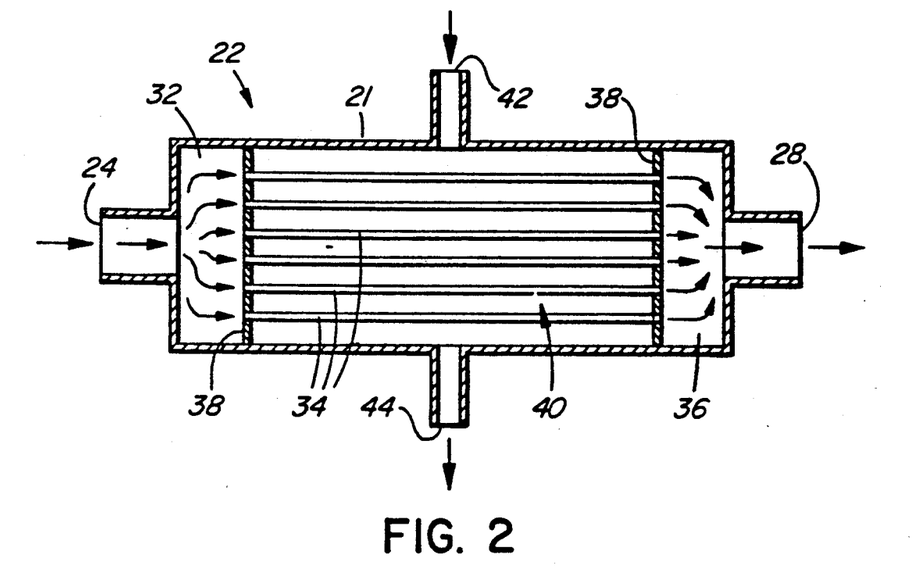
FIG. 2 is a schematical illustration showing a diametrical section through a heat exchanger of the system of FIG. 1.

The air flow system 16 comprises a heat exchanger 22, which is shown in greater detail in FIG. 2, and a main air cleaner 23 and a secondary air cleaner 25. The heat exchanger 22 comprises a generally cylindrical housing 21 having an inlet 24, which is connected to the exhaust manifold 26 of the engine 10 through a conduit 27, and an outlet 28, which is connected to a tailpipe 30 for the discharge of the engine exhaust gases into the atmosphere.

The inlet 24 leads to an inlet chamber 32 in the housing 21 which is connected through a plurality of tubes 34 to an outlet chamber 36, which is in communication with the outlet 28. A pair of endplates 38, between which the tubes 34 are connected, define a central heating chamber 40 between them, which is heated by the exhaust gases flowing through the tubes 34. The heating chamber 40 has an inlet 42, which is connected to the main air cleaner 23, and an outlet 44, which is connected to the carburetor 14, through a conduit 46. The heat exchanger 22 is covered with a heat insulating material (not shown) to prevent heat loss to the atmosphere.

The secondary air cleaner 25 is connected on a branch line 48 to the conduit 46 and a butterfly valve 50 is provided in the branch line 48 to control the flow of air from the secondary air cleaner 25 to the conduit 46. A further butterfly valve 47 is provided in the conduit 46 for controlling the flow of hot air. The valve 47 is mechanically linked to the valve 50, so that the valve 47 closes as the valve 50 is opened and vice versa. The valve 47 is set such that its maximum open position is only about a third of the fully open position, as this has been found to be sufficient for the amount of heated air which is required to be delivered to the carburetor 14. The valve 50 is set such that it is capable of opening fully. A thermostat 52 is provided in the conduit 46 for controlling the butterfly valves 47 and 50 responsive to the temperature of the air in the conduit 46, as will be described in more detail below.

The fuel flow system 18 comprises a fuel tank 60, having an outlet 62 at its bottom, which is connected to the carburetor 14 through a conduit 63 via a tap 64, an in-line fuel filter 66, an electronic solenoid check valve 68 and a spring loaded check valve 69.

Figure 3:
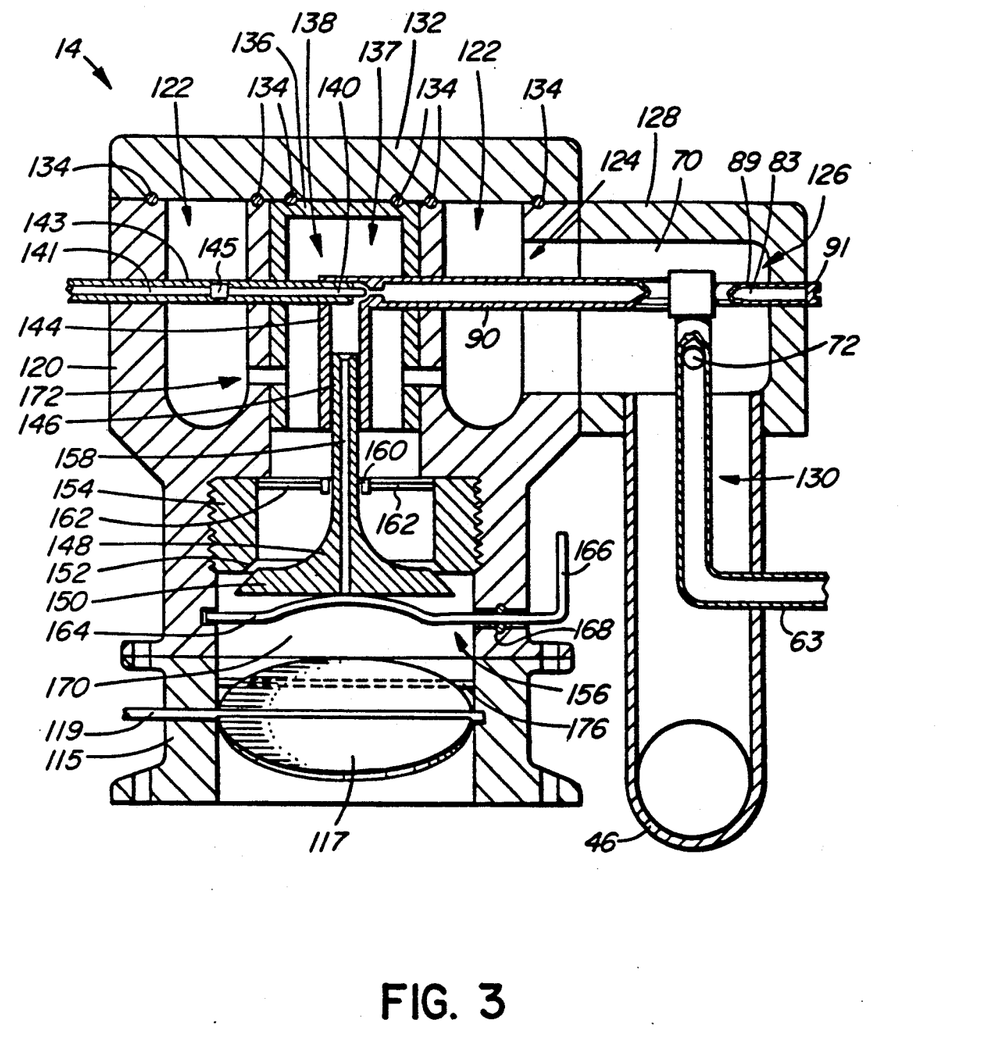
FIG. 3 is a schematical illustration showing a diametrical section through a carburetor according to the invention.
Figure 4:
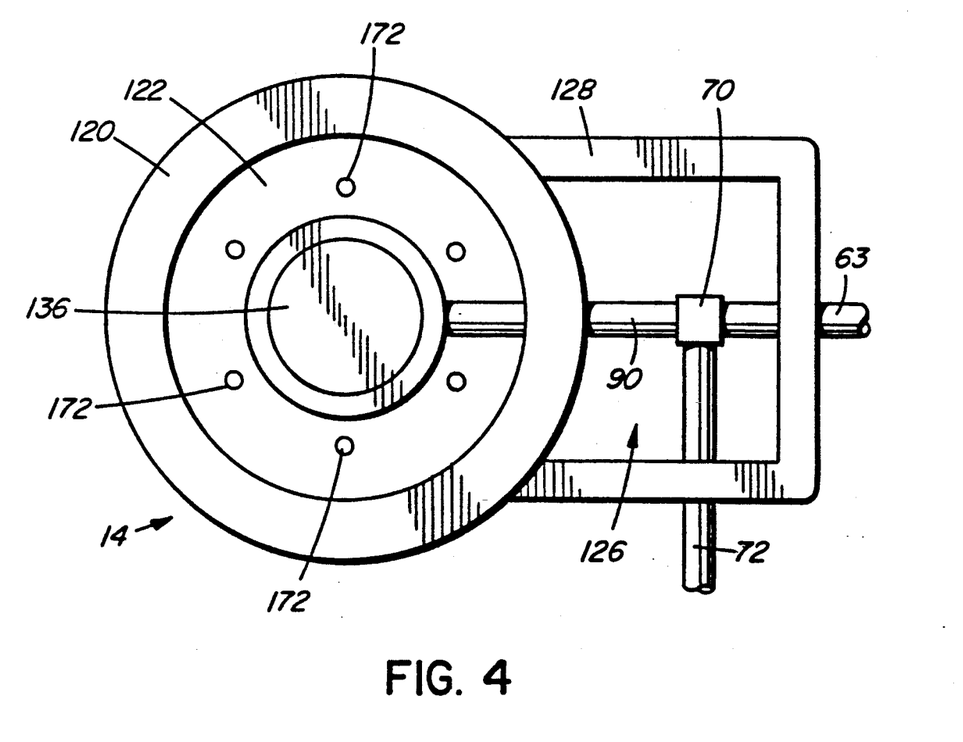
FIG. 4 is a schematical plan view of the carburetor of FIG. 3 with the top cover removed for illustrative purposes.

Inside the carburetor 14, the conduit 63 is provided with a control valve 70 and a conduit 72 which branches off from the conduit 63 upstream of the control valve 70 (FIGS. 3 and 4). The conduit 72 returns to the fuel tank 60 via a second control valve 73, a further solenoid valve 71 and a cooling coil 74, the latter being placed so as to receive air passing through the radiator (not shown) which forms part of the conventional water cooling system of the engine 10 and which is separate from the water flow system 20 which will be described below.

Figure 5A:
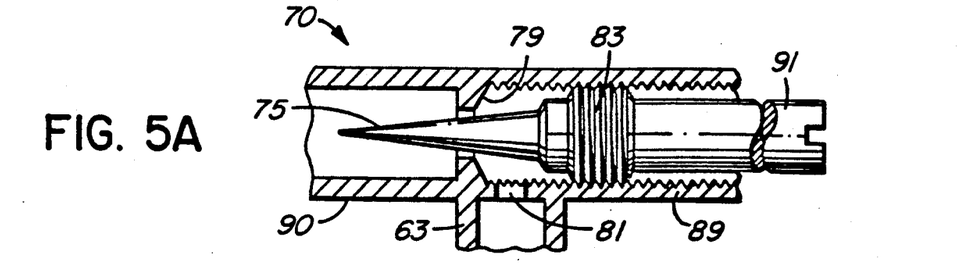
FIG. 5A is a schematical illustration showing a cross-section through a needle control valve used in the fuel inlet system of FIG. 1.
Figure 5B:
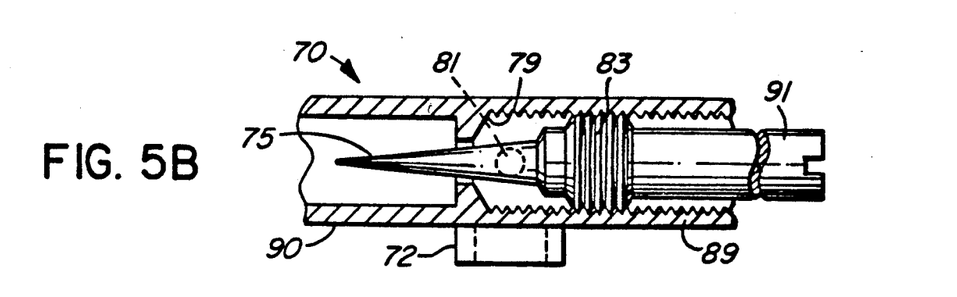
FIG. 5B is a section taken at right angles to the section of FIG. 5A, showing the needle control valve from the top.

The control valve 70 is a needle valve and is shown in more detail in FIGS. 5A and B. The valve 70 comprises a needle 75 which is associated with a valve seat 79. The needle 75 is further associated with an orifice 81 for controlling the flow of fuel through the valve 70. The needle 75 is connected to a screw threaded stem 83 which cooperates with a screw threaded sleeve 89. The stem 83 terminates in a tool receiving head 91, for receiving an adjustment tool, such as a screw driver, for rotating the stem 83 in order to adjust the longitudinal position of the needle 75 in the sleeve 89. The needle 75 is tapered and, as its longitudinal position in the sleeve 89 is adjusted, it progressively opens or closes the orifice 81, thus providing a finely controlled flow of fuel through the orifice 81 to the carburetor 14 along a conduit 90.

The return of the fuel to the tank 60 is via an inlet 76 which is located in the upper part of the fuel tank 60 (although FIG. 1 is generally a plan view, the fuel tank 60 is shown in side view to illustrate the locations of the outlet 62 and the inlet 76). A fuel pump 77 is provided for pumping the fuel around the fuel flow system 18. The fuel pump 77 is preferably a rotary pump and not an impulse pump, to provide a steady flow of fuel circulating around the fuel flow system 18.

The water flow system 20 comprises a water storage tank 80 (also shown in side view) which has an outlet 82 which is connected to a water heater 84 through a conduit 86 via a tap 85, an in-line filter 87 and a solenoid switch 88. The heater 84 is shown in more detail in FIGS. 7 and 8. It comprises a base 92 of heat-absorbing material provided with a U-shaped groove 94 therein and a cover 96 for the base 92. A heating tube 98 is located in the groove 94. The conduit 86 is connected to one end 100 of the tube 98. The other end 102 is connected to an inlet in the air intake manifold of the engine 10, at a location below the carburetor 14, by means of a conduit 104. A vacuum control valve 105, which is operated from the engine vacuum, is provided in the conduit 104 for controlling the flow of water to the engine responsive to engine load, as will be described in more detail below.

Figure 7:
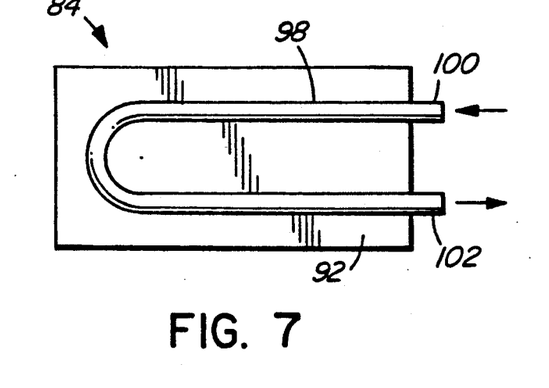
FIG. 7 is a plan view of a water heating element of the system of FIG. 1.
Figure 8:
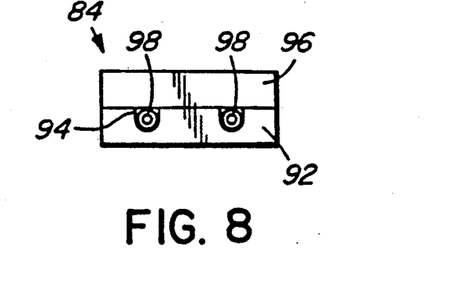
FIG. 8 is an end view of the heating element of FIG. 7.

The heater 84 is attached to the side of the conduit 27 leading from the exhaust manifold 26. Thus, the heater 84 is heated by the engine exhaust gases to heat the water flowing through the tube 98, so that it exits as steam at a temperature above 100° C. (212° F.), i.e. as superheated steam, at the outlet end 102.

The water tank 80 has a filler opening for the introduction of water into the tank 80 and an airtight cover 108 is provided for the opening. An inlet 110 is provided on the tank 80 which is connected, via a cooling coil 112 and an air filter 114, to the exhaust conduit 27. In this way, exhaust pressure is applied to the area above the water in the tank 80 for providing a flow of water along the conduits 86 and 104 when the engine 10 is under load. The purpose of the filter 114 is to filter solid particles, such as carbon, out of the exhaust air. A suitable arrangement for this purpose has been found to be a sheet of bronze mesh rolled up into cylindrical form and located in a cylindrical housing and arranged for the air to flow longitudinally through the cylindrical body of mesh.

Referring now to FIGS. 3 and 4, the carburetor 14 is shown in more detail. It is bolted onto the conventional carburetor throttle assembly 115 which is bolted onto the engine intake manifold. The carburetor throttle assembly 115 includes a throttle valve 117 (butterfly valve) which is operatively connected, through the throttle linkage 119 (not shown in detail), to the accelerator pedal in the drive cabin of the vehicle.

The carburetor 14 comprises a cylindrical main body 120 of aluminum which is provided with an annular chamber 122 in its upper part. On one side of the main body 120, there is provided an opening 124 which is in communication with a fuel preheating chamber 126 provided in a secondary aluminum body 128 which is mounted on one side of the main body 120.

The secondary body 128 has an opening 130 at its lower end to which is connected the conduit 46 coming from the heat exchanger 22. The conduit 46 has been omitted in FIG. 4. The fuel conduit 63 passes through the preheating chamber 126 and the fuel is heated by the hot incoming air from the conduit 46. The annular chamber 122 receives the heated air coming from the chamber 126 and this air circulates in the annular chamber 122. This distributes heat evenly through the carburetor 14 and also serves as an extension of the pre-heating chamber 126 to continue heating the fuel flowing along the conduit 90.

An aluminum cover 132 is provided for the main body 120 and reference numerals 134 refer to O-rings located in grooves between the main body 120 and the cover 132 to provide an airtight seal. The O-rings 134 are not shown in FIG. 4.

Figure 6A:
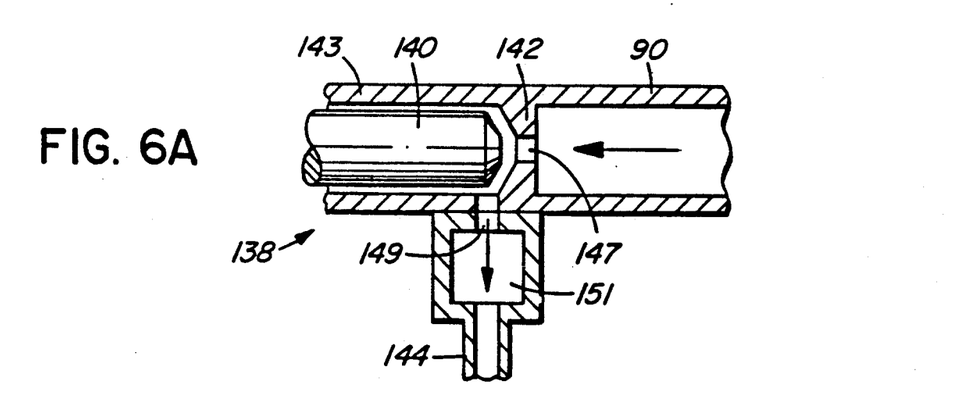
FIG. 6A is a schematical representation showing a section through another control valve of the fuel inlet system of FIG. 1.
Figure 6B:
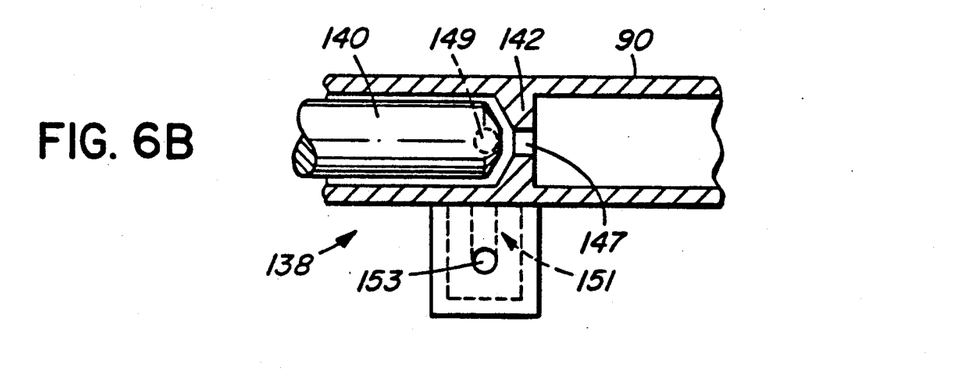
FIG. 6B is a schematical representation showing a section through the valve of FIG. 6A, which section is at right angles to the section of FIG. 6A.

The main body 120 has a central bore in which is located a central sleeve 136 forming a central chamber 137 and in which is housed a control valve 138. The valve 138 is shown in more detail in FIGS. 6A and B. The view shown in FIG. 6A is from the side and the view shown in FIG. 6B is from the top. The valve 138 has a plunger 140 which cooperates with a valve seat 142. A bore 147 is provided in the valve seat 142. The plunger 140 is connected to a screw threaded stem 141 which cooperates with a screw-threaded sleeve 143 so that rotation of the stem 141 in the sleeve 143 moves the plunger 140 relative to the valve seat 142. A packing gland 145 is provided on the stem 141 to provide an airtight seal. The stem 141 is operatively connected to the throttle linkage 119 which is connected to the main carburetor butterfly valve 117. The arrangement is such that, as the carburetor butterfly valve 117 opens due to depression of the accelerator pedal, it also opens the valve 138 to increase the fuel supply, responsive to the engine demand.

The valve 138 controls the amount of fuel entering a central inlet conduit 144, responsive to the position of the stem 140 relative to the valve seat 142. Fuel flows towards the valve 138 through the conduit 90 and through the bore 147 in the valve seat 142 into the central conduit 144 through an orifice 149, as shown by the arrows in FIG. 6A. Downstream of the orifice 149, there is a chamber 151 which is vented to the central chamber 137 through a bore 153, which is drilled at an angle so that its outlet is directed towards the orifice 149. This allows for heated air to be drawn into the conduit 144 with the heated fuel so that some mixing of fuel and air is effected prior to the fuel reaching the mixing chamber 170 of the carburetor 14.

In the conduit 144 is located, for longitudinal movement therein, the stem 146 of a valve 148. The valve 148 has a head 150 which cooperates with a valve seat 152 provided by a stainless steel annular member 154 which is screwed into a lower larger diameter bore 156 in the main body 120. The valve 148 has a central bore 158 extending therethrough, the upper end of which is tapered, as shown. The annular member 154 is provided with a central eye 160 supported by three webs 162 to support the valve stem 146 and yet allow the flow of air through the central chamber 137.

Figure 9:
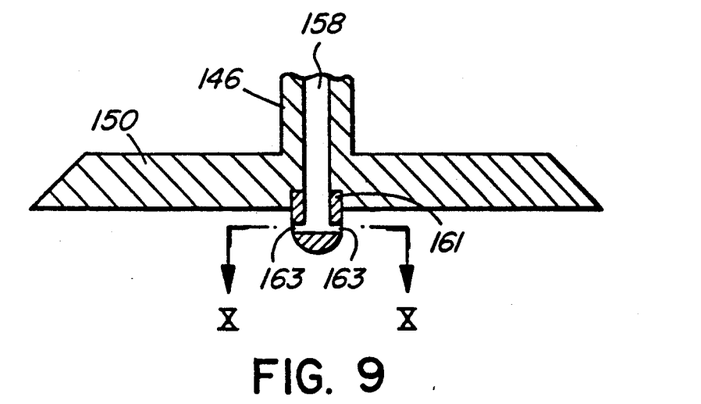
FIG. 9 is a fractional view showing a fuel distribution nozzle for injecting fuel into a mixing chamber of the carburetor of FIG. 3.
Figure 10:
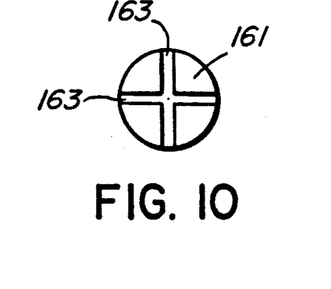
FIG. 10 is a section taken along the lines IX—IX in FIG. 9.

At its outlet end the bore 158 is provided with a fuel distribution nozzle 161 (not shown in FIG. 1 but shown in FIGS. 9 and 10). It comprises four channels 163 perpendicular to the central bore 158 to provide four jets of fuel and air exiting in four mutually perpendicular horizontal directions from the distributor nozzle 161.

The valve head 150 is supported on a cranked wire element 164 forming a cam for cooperation with the lower surface of the valve head 150 and having a crank arm 166 projecting on the outside of the main body 120. Thus, the valve 148 is free floating in the sense that it is not anchored to the element 164 and is free to move upwards, only its downward movement being restrained by the element 164. This arrangement renders the valve 148 "explosion proof" because it can close on backfiring of the engine 10. The element is supported by a blind bushing at one end and an O-ring seal 168 is provided to seal the exit of the arm 166.

A spring (not shown) is provided for biasing the arm 166 to a closed position of the valve 148, i.e. a position in which the head 150 is seated against the seat 152. A set screw (not shown) is provided for moving the arm 166 against the bias of the spring to set the valve 148 to a desired open position. The valve 148, therefore, regulates the amount of air flowing from the central chamber 137 into an air/fuel mixing chamber 170 of the carburetor 14 located downstream of the valve 148 in the lower part of the body 120. The valve 148 is adjusted so that it allows only about 15-20% of the air to flow into the mixing chamber 170, as compared with the situation where the valve 148 is totally absent. This adjustment will be described in greater detail below.

The annular chamber 122 is connected to the central chamber 137 by means of six circumferentially spaced openings 172. Thus, heated air entering the preheating chamber 126 passes through the opening 124 into the annular chamber 122 and from there into the central chamber 137 through the openings 172. From the central chamber 137, the air is sucked past the valve 148 into the mixing chamber 170 and then past the butterfly valve 117 of the conventional carburetor butterfly valve assembly 115 and into the engine intake manifold to the combustion chambers (not shown) of the engine 10 under influence of the vacuum created by the engine 10.

Figure 11:
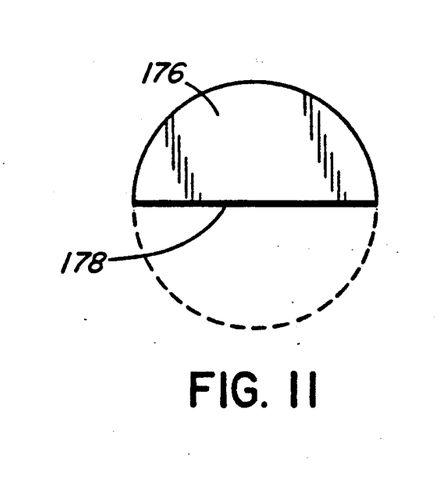
FIG. 11 is a plan view of a semi-circular barrier plate which is located adjacent the throttle valve in the fuel inlet system of FIG. 1.

In the flow passage downstream of the valve 148 and associated with the throttle valve 117, there is provided a semi-circular plate 176 which permanently blocks off one-half of the flow passage. The plate 176 is located adjacent the throttle valve 117 so that when the throttle valve 117 is fully open one of its vanes is up against the straight edge 178 of the semi-circular plate 176. Thus, when the throttle butterfly valve 117 is fully open, effectively only half of the cross-section of the flow channel is open to flow.

The openings 172 have diameters so that sound waves are generated as the air passes therethrough. This "whistling effect" is believed to enhance the mixing of air and fuel in the mixing chamber 170.

OPERATION

The operation of the fuel inlet system 12, will now be described.

The function of the solenoid valves 68 and 71 in the fuel flow system 18 is to close when the engine ignition circuit is switched off so that no flow of fuel beyond the valves 68 and 71 is possible when the ignition is switched off. The tap 64 is simply a manually operated valve for closing the fuel tank 60 when required, such as when repairs or servicing is carried out. The same applies to the tap 85 in the water flow system 20. The electric fuel pump 77 is connected to the ignition circuit so that when the ignition is switched on, the pump 77 starts pumping fuel at the same time the solenoid valves 68 and 71 open. Thus, fuel starts circulating in the fuel flow system 18 before the engine starts running, to facilitate easy starting of the engine 10. The valve 138 is set to an initial setting which delivers sufficient fuel for smooth idling of the engine 10 after starting.

The fuel pump 77 delivers the fuel at a conventional pressure of 4¾ p.s.i. and the purpose of the spring-loaded check valve 69 is to lower the fuel pressure due to the resistance it offers to the fuel flow therethrough. The valve 69 is set so that the pressure of the fuel exiting the valve 69 is about 2 p.s.i. The valve 73 in the fuel return line 72 acts as a further regulator of fuel pressure by virtue of the amount of fuel which it allows to flow through the return line 72. The valve 73 is set so that the pressure of the fuel at the control valve 70 inside the pre-heating chamber 126 is about 1 to 1¼ p.s.i. The valve 73 is of similar type to the valve 138, i.e. in that it has a stem 140 cooperating with a valve seat 142 provided with a bore 147, except that the bore 147 is larger.

The needle valve 70 controls the amount of fuel which is diverted from the main fuel flow in the fuel flow system 18 and diverted to the engine 10. The valve 70 is set so as to permit sufficient fuel through to allow the engine 10 to run smoothly at high revolutions and to allow all the remaining fuel to flow past into the return line 72. Thus, an oversupply of fuel to the carburetor 14 is prevented, all the excess fuel being returned to the fuel tank 60. The valve 70 can be adjusted by weaning it down to a point at which the engine 10 starts to stall when running at high revolutions and then to open the valve 70 slightly until the engine runs smoothly. The fuel flow system 18 thus operates to provide a continuously flowing steady stream of fuel from which only the required supply for combustion is tapped by means of the valve 70. This counteracts the formation of gas bubbles in the fuel to prevent "air lock".

From the control valve 70, the fuel flows to the valve 138 which, as described above, is linked to the conventional throttle linkage 119 and is controlled responsive to depression of the accelerator pedal inside the drive cabin of the vehicle, powered by the engine 10.

When the engine 10 is running, atmospheric air is sucked into the air flow system 16 through the main air cleaner 23 as a result of the vacuum created in the engine intake manifold. Initially, the butterfly valve 47 is open and the valve 50 is closed so that no air is sucked in through the secondary air cleaner 25.

The air passes through the heat exchanger 22 and is heated up to a temperature which can be as high as 600° to 700° F. by the hot exhaust gases. The heated air passes along the conduit 46, past the thermostat 52 and into the inlet 130 to the pre-heating chamber 126. The ideal is to permit only air which is in a temperature range of between about 375° to 400° F. into the pre-heating chamber 126. This is controlled by the thermostat 52 which is operatively linked to the butterfly valves 47 and 50. The thermostat 52 is set to operate the butterfly valves 47 and 50 to suck in colder atmospheric air through the secondary air cleaner 25 and to limit the flow of heated air when the air temperature in the conduit 46 rises above 375° F. In this way, the temperature of the air entering the pre-heating chamber 126 is controlled to a value of around 375° F. It is to be avoided that the air temperature exceeds 400° F. because at this stage, it is found that the engine 10 does not operate satisfactorily.

Modern day petroleum or fuel is a complex mixture of hydrocarbons of varying volatility, the higher boiling point components having a boiling point of just below 375° F. Thus, the air temperature of 375° F. is designed to transform the fuel into a dry vapour state, i.e. a state where there are no liquid droplets present and the fuel is in a pure gaseous state, for the subsequent mixing thereof with the air. For this purpose, pre-heating of the fuel takes place in the pre-heating chamber 126, which heating is continued in the main body 120 of the carburetor 14. The annular chamber 122 serves to keep the main body 120 evenly heated to counteract subsequent cooling of the fuel. When the fuel, which is already mixed with some air, is ejected from the nozzle 161 into the mixing chamber 170, it is in the form of a gas which is sprayed in the form of laterally directed jets into the air stream passing through the valve 148. Thus, after a preliminary mixing of fuel and air in the conduit 144, this initial air fuel mixture is subjected to a further mixing with air in the mixing chamber 170 when it is sprayed into the air flowing into the mixing chamber 170 through the annular opening between the valve head 150 and the valve seat 152.

As described above, the valve 148 allows only about 15 to 20% of the amount of air through which would otherwise have passed through had the valve 148 not been there. The setting of the valve 148 is carried out while the engine 10 is running at high revolutions. This is done by setting the valve 148 so that the engine runs smoothly at high revolutions. It has been found that this arises when only about 15 to 20% of the air is allowed through. If the valve 148 is not open far enough, the engine will stall due to the air/fuel mixture being too rich, as is the case if the valve 148 is open too wide when the air-fuel mixture is too lean.

The function of the valve 148, in conjunction with the plate 176, in cutting down the amount of air being fed to the engine 10, increases the engine vacuum, thus creating a bigger suction on the fuel entering through the central bore 158 in the valve 148. As referred to above, the valve 148 is located upstream of the conventional carburetor butterfly valve 117, thus forming a restriction in the air flow path upstream of the conventional air intake butterfly valve 117.

The cooling coil 74 serves to cool the fuel returning to the fuel tank 60.

The purpose of the water being injected into the intake manifold of the engine 10 is to cool the valves of the engine 10, to counteract the formation of deposits, and it is believed that it also adds to the fuel efficiency of the engine 10.

The water is introduced into the water flow system 20 by means of the pressure created on the surface of the water in the tank 80 from the exhaust manifold. The solenoid valve 88 is arranged not to open until the throttle is opened to at least about 20%. The amount of water flowing to the engine 10 is regulated by the vacuum control valve 105 which is closed at high vacuum and opens progressively as the vacuum decreases, as the throttle is opened, i.e. when the engine is under increasing load. Thus, water is supplied to the engine only when it is under load.

It has been found that, for optimum operation, the ignition timing of the engine 10 should be advanced to about 26° under engine idling conditions, instead of the normal 8° to 13° when used with conventional carburetors.

Tests have shown that the fuel inlet system 12 results in significant increases in fuel efficiency. Apart from fuel efficiency, another important factor in operating an internal combustion engine is air pollution. Air pollution from internal combustion engines arises mainly from unburned hydrocarbons and nitrogen oxides in the exhaust gases. To remove the unburned hydrocarbons from exhaust gases, catalytic mufflers were introduced to burn the residual hydrocarbons away. These catalytic mufflers in turn resulted in the requirement of having lead-free fuel because the mufflers became rapidly poisoned by lead compounds. It is expected that with the more complete combustion of hydrocarbons achieved by the fuel inlet system 12 of the present invention, the need for such catalytic mufflers may diminish.

The nitrogen oxides present in exhaust gases are due to the oxidation of the nitrogen component in the atmospheric air being fed to the engine for combustion of the fuel. This problem becomes more pronounced the larger the amount of air which is fed to the combustion chamber. Due to the fact that significantly less air is introduced into the engine in the fuel inlet system 12, it is expected that the presence of nitrogen oxides in the exhaust gases will also be significantly less.

While only a preferred embodiment of the invention have been described herein in detail, the invention is not limited thereby and modifications can be made within the scope of the attached claims.

What is claimed is:

1. A fuel inlet system for an internal combustion engine, comprising:
  means for providing a continuous flow of fuel in a main flow line;
  means for diverting part of said fuel flowing in said main flow line into a branch line connected to a fuel/air mixing chamber of a carburetor means for mixing said diverted fuel with air in a first mixing zone to obtain a preliminary air/fuel mixture; and means for mixing said preliminary air/fuel mixture with air in a second mixing zone to obtain a combustible air/fuel mixture for injection into an intake minifold of an internal combustion engine.

2. The system according to claim 1, further comprising means for heating the fuel in said branch line prior to entry of the fuel into said first mixing zone.

3. The system according to claim 1, further comprising means for heating the air prior to entry into said first mixing zone to obtain a volume of heated air.

4. The system according to claim 3, wherein said fuel heating means comprises means for exposing the fuel flowing in said branch line through the intermediary of a heat conductor to said volume of heated air.

5. The system according to claim 4, wherein said main flow line extends from a fuel reservoir around a loop and back to said fuel reservoir and further comprising a pump for circulating the fuel in said main line.

6. The system according to claim 4, further comprising valve means for controlling the flow of air to said second mixing zone.

7. The system according to claim 6, comprising injection means for injection of said preliminary air/fuel mixture into said second mixing zone in the form of a jet stream.

8. The system according to claim 4, wherein said diverting means comprises a needle valve.

9. The system according to claim 4, further comprising control valve means for controlling the amount of fuel flowing into said first mixing zone, responsive to engine demand.

10. The system according to claim 4, further comprising valve means for reducing the fuel pressure at said diverting means.

11. The system according to claim 4, further comprising:
a preheating chamber in which said fuel heating means is located;
means for controlling the temperature of the heated air entering said preheating chamber to between about 360° F. and about 400° F.

12. The system according to claim 3, wherein said air heating means comprises a heat exchanger which is heated by internal combustion engine exhaust gases.

13. The system according to claim 1, further comprising means for adding water to said combustible air/fuel mixture prior to injection of the combustible air/fuel mixture in a combustion chamber of an internal combustion engine.

14. The system according to claim 13, further comprising means for transforming said water into steam prior to adding said water to the air/fuel mixture.

15. The system according to claim 14, wherein said water adding means is connected to the intake manifold of the internal combustion engine.

16. A carburetor comprising:
a body member having a fuel inlet and an air inlet;
a first mixing zone in the body member;
a second mixing zone in the body member;
a fuel conduit connecting the fuel inlet to said first mixing zone;
a main air flow channel between said air inlet and said second mixing zone;
a secondary air flow channel between said air inlet and said first mixing zone; and
a fluid flow channel from said first mixing zone to said second mixing zone.

17. The carburetor according to claim 16, wherein the body member has an upper part and a lower part with said second mixing zone being located in the lower part of the body member and further comprising:
an annular heating chamber in said upper part which is connected to the air inlet;
a central chamber surrounded by said annular chamber and connected to said second mixing zone for the flow of air from the central chamber to said second mixing zone;
air flow communication means between said annular chamber and said central chamber for the flow of air from said annular chamber to said central chamber.

18. The carburetor according to claim 17, wherein said first mixing zone is located inside said central chamber.

19. The carburetor according to claim 18, further comprising valve means between said central chamber and said second mixing zone for controlling the amount of air flowing to said second mixing zone.

20. The carburetor according to claim 18, wherein said valve comprises a head for cooperation with a valve seat and a stem extending from said head into said central chamber, the stem being provided with a central bore therein which is in communication with said first mixing zone at its end distant from said head and its other end forming an outlet into said second mixing zone.

21. The carburetor according to claim 20, wherein the fuel inlet has connection means for connecting the fuel conduit as a branch line of a main fuel flow line to divert part of the fluid flow along said main line into said fuel conduit.

22. The carburetor according to claim 21, further comprising fuel metering means for controlling the amount of fuel flow into said fuel conduit.

23. The carburetor according to claim 22, wherein said fuel metering means comprises a needle valve.

24. The carburetor according to claim 23, further comprising adjustable fuel flow control means for controlling fuel flow to said first mixing zone responsive to engine demand.

25. The carburetor according to claim 24, wherein said fuel conduit extends through said annular chamber.

26. The carburetor according to claim 24, further comprising a fuel pre-heating chamber upstream of and in communication with said annular chamber, said fuel pre-heating chamber having an inlet for heated inflowing air, said fuel conduit extending through said preheating chamber for thermal contact with said inflowing air.

27. The carburetor according to claim 17, wherein said air flow communication means between the annular chamber and the central chamber comprise a plurality of circumferentially spaced holes extending between said annular chamber and said central chamber for producing sound waves during passage of air therethrough.

28. A fuel inlet system for an internal combustion engine, comprising:
means for circulating fuel in a main flow path extending from a fuel reservoir past a carburetor and returning to said fuel reservoir;
means for diverting part of said fuel circulating in said main flow path into a branch line connected to a fuel/air mixing chamber of said carburetor;

means for supplying air to said mixing chamber to mix with said fuel to produce a combustible air/fuel mixture;

means for heating the air supply to said mixing chamber at a location prior to entry into said carburetor;

means for exposing said branch line to said heated air to preheat the fuel flowing in said branch line; and air flow restriction means for restricting the amount of air flowing into said mixing chamber.

29. The system according to claim 28, further comprising valve means for reducing the pressure of fuel flowing in said branch line.

30. The system according to claim 29, further comprising means for adding water to said air/fuel mixture.

31. The system according to claim 30, further comprising means for transforming said water into steam prior to adding said water to the air/fuel mixture.

32. The system according to claim 28, wherein said means for preheating the fuel comprises a pre-heating chamber ground the branch line at a location upstream of said mixing chamber and connected to said heated air for the flow of heated air through said pre-heating chamber in thermal contact with said branch line.

33. The system according to claim 32 further comprising means for maintaining the temperature of said heated air entering the pre-heating chamber to a value of between about 360° F. to 400° F.

34. The system according to claim 33, wherein said air heating means comprises a heat exchanger which is heated by internal combustion engine exhaust gases.

35. The system according to claim 28, wherein said means for directing part of said fuel circulating in said main flow path into a branch line, comprises a needle valve located at a junction of said branch lien with said main flow path.

36. A carburetor comprising:
a body member having an upper part and a lower part;
an annular heating chamber in said upper part for connection to a supply of inflowing air;
a central chamber surrounded by said annular chamber;
air flow communication means between said annular chamber and said central chamber for the flow of air from said annular chamber to said central chamber;
an air/flow mixing chamber in the lower part of said body member which is in communication with said central chamber for the flow of air from said central chamber to said mixing chamber; and
a fuel supply conduit on said body member for connection to a fuel supply and terminating in a terminal portion provided with nozzle means for ejecting fuel into said mixing chamber.

37. The carburetor according to claim 36, further comprising means for restricting the flow of air from said central chamber to said mixing chamber.

38. The carburetor according to claim 37, wherein said air flow restricting means comprises an adjustable valve between the central chamber and the mixing chamber.

39. The carburetor according to claim 38, wherein said valve comprises a head for cooperation with a valve seat and a stem extending from said head into said central chamber, the stem being provided with a central bore therein which is in communication with said fuel conduit and which central bore forms said terminal portion of the fuel conduit.

40. The carburetor according to claim 39, wherein the fuel conduit has connection means for connecting the fuel conduit as a branch line of a main fuel flow line to divert part of the fluid flow along said main line into said fuel conduit.

41. The carburetor according to claim 40, further comprising fuel metering means for controlling the amount of fuel flow into said fuel conduit.

42. The carburetor according to claim 41, wherein said fuel metering means comprises a needle valve.

43. The carburetor according to claim 42, further comprising adjustable fuel flow control means downstream of said fuel metering means, for connection to a carburetor throttle assembly to control fluid flow to said mixing chamber responsive to engine demand.

44. The carburetor according to claim 43, further comprising a fuel pre-heating chamber upstream of said annular chamber, said fuel pre-heating chamber having an inlet for said in flowing air, said fuel conduit extending through said pre-heating chamber for thermal contact with said inflowing air.

45. The carburetor according to claim 36, wherein said air flow communication means between the annular chamber and the central chamber comprise a plurality of circumferentially spaced holes extending between said annular chamber and said central chamber for producing sound waves during passage of air therethrough.

46. A fuel inlet system for an internal combustion engine, comprising:
a fuel flow line extending form an outlet in a fuel reservoir around a loop to an inlet in said reservoir;
means for providing a continuous flow of fuel around said fuel flow line;
a carburetor;
a branch line connected between said carburetor and said fuel flow line;
means for diverting part of said flow of fuel form said flow line into said branch line;
means for introducing air into said carburetor;
means for heating the air prior to entry into said carburetor; and
means for heating the fuel in said branch line, wherein said fuel heating means comprises means for exposing said branch line to said heated air.

* * * * *

UNITED STATES PATENT AND TRADEMARK OFFICE
CERTIFICATE OF CORRECTION

PATENT NO. : 5,213,086
DATED : May 25, 1993
INVENTOR(S) : Sims, Fred

It is certified that error appears in the above-identified patent and that said Letters Patent is hereby corrected as shown below:

```
Column 11, line 37; change "lien" to --line--

Column 11, line 51; change "air/flow" to --air/fuel--
```

Signed and Sealed this

Ninth Day of November, 1993

Attest:

BRUCE LEHMAN

Attesting Officer          Commissioner of Patents and Trademarks